United States Patent
Zhu et al.

(10) Patent No.: US 10,572,907 B2
(45) Date of Patent: Feb. 25, 2020

(54) SYSTEMS AND METHODS FOR A SEARCH ENGINE MARKETING INTERNAL AUCTION SYSTEM

(71) Applicant: WAL-MART STORES, INC., Bentonville, AR (US)

(72) Inventors: Tao Zhu, Millbrae, CA (US); Madhusudan Mathihalli, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 357 days.

(21) Appl. No.: 15/420,380

(22) Filed: Jan. 31, 2017

(65) Prior Publication Data
US 2018/0218409 A1 Aug. 2, 2018

(51) Int. Cl.
*G06Q 30/00* (2012.01)
*G06Q 30/02* (2012.01)

(52) U.S. Cl.
CPC ..... *G06Q 30/0275* (2013.01); *G06Q 30/0249* (2013.01); *G06Q 30/0256* (2013.01)

(58) Field of Classification Search
None
See application file for complete search history.

(56) References Cited

U.S. PATENT DOCUMENTS

| | | | | |
|---|---|---|---|---|
| 6,732,372 | B2 * | 5/2004 | Tomita | H04N 5/44543 348/563 |
| 7,305,350 | B1 * | 12/2007 | Bruecken | G06Q 10/08 340/988 |
| 7,366,696 | B1 * | 4/2008 | Ganesan | G06Q 20/10 705/35 |
| 7,533,084 | B2 * | 5/2009 | Holloway | G06F 16/958 |
| 7,555,195 | B2 * | 6/2009 | Yamashita | G06Q 20/1235 386/248 |
| 7,577,244 | B2 * | 8/2009 | Taschereau | G06Q 30/0241 379/218.01 |
| 2002/0007313 | A1 * | 1/2002 | Mai | G06Q 30/02 705/14.13 |
| 2002/0026508 | A1 * | 2/2002 | Crain | G06Q 10/109 709/224 |
| 2002/0046084 | A1 * | 4/2002 | Steele | G06Q 30/02 705/14.64 |

(Continued)

*Primary Examiner* — Matthew T Sittner
(74) *Attorney, Agent, or Firm* — Bryan Cave Leighton Paisner LLP (57) ABSTRACT

Systems and methods including one or more processing modules and one or more non-transitory storage modules storing computing instructions configured to run on the one or more processing modules and perform acts of receiving, from a plurality of entities, objectives and budgets associated with a plurality of keywords, determining cost-per-click (CPC) bids for each of the entities for some of the plurality of keywords using the objectives and the budgets, determining internal bids by the plurality of entities for the plurality of keywords by multiplying the CPC bid and a pacing multiplier, performing one or more iterative internal auctions, determining a highest bidder for each keyword of the plurality of keywords, and coordinating bidding by only the highest bidding entity for each of the keywords on a third-party external auction.

20 Claims, 5 Drawing Sheets

(56) References Cited

U.S. PATENT DOCUMENTS

| | | | |
|---|---|---|---|
| 2002/0057299 A1* | 5/2002 | Oren | G06F 16/957 715/825 |
| 2002/0078144 A1* | 6/2002 | Lamkin | G06F 21/10 709/203 |
| 2002/0147638 A1* | 10/2002 | Banerjee | G06Q 30/02 705/14.53 |
| 2003/0083937 A1* | 5/2003 | Hasegawa | G06Q 30/0253 705/14.53 |
| 2003/0195021 A1* | 10/2003 | Yamashita | G06Q 20/1235 463/1 |
| 2004/0076279 A1* | 4/2004 | Taschereau | G06Q 30/0241 379/218.01 |
| 2005/0004897 A1* | 1/2005 | Lipson | G06K 9/6206 |
| 2005/0114366 A1* | 5/2005 | Mathai | G06Q 30/02 |
| 2005/0187823 A1* | 8/2005 | Howes | G06Q 30/02 705/14.58 |
| 2005/0197924 A1* | 9/2005 | Janakiraman | G06Q 30/02 709/227 |
| 2006/0020962 A1* | 1/2006 | Stark | G11B 27/034 725/32 |
| 2006/0064346 A1* | 3/2006 | Steenstra | G06Q 30/0261 705/14.64 |
| 2006/0116926 A1* | 6/2006 | Chen | G06Q 30/02 705/14.23 |
| 2006/0212353 A1* | 9/2006 | Roslov | G06Q 30/02 705/14.54 |
| 2006/0224587 A1* | 10/2006 | Zamir | G06F 16/9535 |
| 2006/0224624 A1* | 10/2006 | Korn | G06F 16/9535 |
| 2006/0229930 A9* | 10/2006 | Gottfurcht | G06F 3/04892 705/14.71 |
| 2006/0242267 A1* | 10/2006 | Grossman | G06Q 30/02 709/218 |
| 2006/0277098 A1* | 12/2006 | Chung | G06Q 30/02 705/14.22 |
| 2006/0293065 A1* | 12/2006 | Chew | G06Q 30/02 455/456.3 |
| 2007/0100688 A1* | 5/2007 | Book | G06Q 30/02 705/14.52 |
| 2007/0101365 A1* | 5/2007 | Clark | G06Q 30/02 725/38 |
| 2007/0112735 A1* | 5/2007 | Holloway | G06F 16/958 |
| 2007/0179985 A1* | 8/2007 | Knowles | G06F 16/9574 |
| 2007/0192352 A1* | 8/2007 | Levy | G06F 21/10 |
| 2008/0015932 A1* | 1/2008 | Haeuser | G06Q 30/0277 705/14.73 |
| 2008/0021878 A1* | 1/2008 | Jeong | G06F 16/951 |
| 2008/0077492 A1* | 3/2008 | Ho | G06F 17/212 705/14.69 |
| 2008/0086356 A1* | 4/2008 | Glassman | G06Q 30/02 705/14.41 |
| 2008/0114639 A1* | 5/2008 | Meek | G06Q 30/02 705/14.41 |
| 2008/0133336 A1* | 6/2008 | Altman | G06Q 30/0207 455/456.1 |
| 2008/0195457 A1* | 8/2008 | Sherman | G06Q 30/02 455/414.3 |
| 2008/0196095 A1* | 8/2008 | Sheynblat | G06Q 30/0217 726/9 |
| 2008/0235278 A1* | 9/2008 | Piepenbrink | G06Q 30/02 705/14.69 |
| 2008/0235623 A1* | 9/2008 | Li | G06F 16/9535 715/817 |
| 2008/0255943 A1* | 10/2008 | Morten | G06Q 30/02 705/14.53 |
| 2008/0287107 A1* | 11/2008 | Carinio | H04M 3/4878 455/414.1 |
| 2008/0288354 A1* | 11/2008 | Flinn | G06Q 30/0255 705/14.53 |
| 2009/0007274 A1* | 1/2009 | Martinez | G06F 21/10 726/27 |
| 2009/0068991 A1* | 3/2009 | Aaltonen | G06Q 30/02 455/412.1 |
| 2009/0076897 A1* | 3/2009 | Ennals | G06Q 30/02 705/14.26 |
| 2009/0157509 A1* | 6/2009 | Little | G06Q 30/0253 705/14.51 |
| 2009/0299857 A1* | 12/2009 | Brubaker | G06Q 30/02 705/14.66 |
| 2011/0093342 A1* | 4/2011 | Ennals | G06Q 30/02 705/14.58 |
| 2011/0106625 A1* | 5/2011 | Ennals | G06Q 30/02 705/14.58 |
| 2013/0042188 A1* | 2/2013 | Dobronsky | G06F 3/04817 715/760 |
| 2014/0006141 A1 | 1/2014 | Vassilvitskii et al. | |
| 2015/0112795 A1 | 4/2015 | Jalali et al. | |
| 2015/0134462 A1 | 5/2015 | Jalali et al. | |
| 2016/0110768 A1* | 4/2016 | Ennals | G06Q 30/02 705/14.58 |
| 2018/0218409 A1* | 8/2018 | Zhu | G06Q 30/0275 |

\* cited by examiner

| 405 – Receiving a plurality of keywords related to a plurality of products. |

↓

| 410 – Receiving, from a first entity of a plurality of entities, a first objective and a first budget associated with at least one or more first keywords of the plurality of keywords. |

↓

| 415 – Determining a first cost-per-click (CPC) bid for each of the one or more first keywords using the first objective and the first budget. |

↓

| 420 – Determining one or more first internal bids by the first entity for each of the one or more first keywords. |

↓

| 425 – Receiving, from a second entity of the plurality of entities, a second objective and a second budget associated with at least the one or more first keywords of the plurality of keywords. |

↓

| 430 – Determining a second CPC bid for each of the one or more first keywords using the second objective and the second budget. |

↓

| 435 – Determining one or more second internal bids by the second entity for each of the one or more second keywords. |

↓

| 440 – Performing a first iterative internal auction. |

↓

| 445 – Determining the one or more first internal bids from the first entity comprise a highest bid for the one or more first keywords from the plurality of entities. |

↓

| 450 – Coordinating bidding by only the first entity of the plurality of entities for the one or more first keywords on a third-party external auction. |

SYSTEMS AND METHODS FOR A SEARCH ENGINE MARKETING INTERNAL AUCTION SYSTEM

TECHNICAL FIELD

This disclosure relates generally to internal auction systems for search engine marketing.

BACKGROUND

In conventional search engine marketing (SEM) auctions, a plurality of entities can bid on a plurality of keywords for association with a link or advertisement of the entity. Sometimes, different entities from a single retailer can each bid on a single keyword, thus unnecessarily increasing the bidding and ultimately the cost-per-click (CPC) of the link or advertisement displayed with a keyword on a search engine.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processing modules and one or more non-transitory storage modules storing computing instructions configured to run on the one or more processing modules. The one or more storage modules can be configured to run on the one or more processing modules and perform an act of receiving a plurality of keywords related to a plurality of products. The plurality of keywords can be for search engine marketing. The one or more storage modules also can be configured to run on the one or more processing modules and perform an act of receiving, from a first entity of a plurality of entities, a first objective and a first budget associated with at least one or more first keywords of the plurality of keywords. The one or more storage modules also can be configured to run on the one or more processing modules and perform an act of determining a first CPC bid for each of the one or more first keywords using the first objective and the first budget. The one or more storage modules also can be configured to run on the one or more processing modules and perform an act of determining one or more first internal bids by the first entity for each of the one or more first keywords by multiplying at least the first CPC bid and a first pacing multiplier. The first pacing multiplier can be based on a first overall pacing by the first entity equal to a first planned spend amount of the first entity divided by a first allocated spend amount of the first entity. The one or more storage modules also can be configured to run on the one or more processing modules and perform an act of receiving, from a second entity of the plurality of entities, a second objective and a second budget associated with at least the one or more first keywords of the plurality of keywords. The one or more storage modules also can be configured to run on the one or more processing modules and perform an act of determining a second CPC bid for each of the one or more first keywords using the second objective and the second budget. The one or more storage modules also can be configured to run on the one or more processing modules and perform an act of determining one or more second internal bids by the second entity for each of the one or more second keywords by multiplying at least the second CPC bid and a second pacing multiplier. The second pacing multiplier can be based on a second overall pacing by the second entity equal to a second planned spend amount of the second entity divided by a second allocated spend amount of the second entity. The one or more storage modules also can be configured to run on the one or more processing modules and perform an act of performing a first iterative internal auction. The one or more storage modules also can be configured to run on the one or more processing modules and perform an act of determining the one or more first internal bids from the first entity comprise a highest bid for the one or more first keywords from the plurality of entities. The one or more storage modules also can optionally be configured to run on the one or more processing modules and perform an act of coordinating bidding by only the first entity of the plurality of entities for the one or more first keywords on a third-party external auction.

Various embodiments include a method. The method can include receiving a plurality of keywords related to a plurality of products. The plurality of keywords can be for search engine marketing. The method also can include receiving, from a first entity of a plurality of entities, a first objective and a first budget associated with at least one or more first keywords of the plurality of keywords. The method also can include determining a first CPC bid for each of the one or more first keywords using the first objective and the first budget. The method also can include determining one or more first internal bids by the first entity for each of the one or more first keywords by multiplying at least the first CPC bid and a first pacing multiplier. The first pacing multiplier can be based on a first overall pacing by the first entity equal to a first planned spend amount of the first entity divided by a first allocated spend amount of the first entity. The method also can include receiving, from a second entity of the plurality of entities, a second objective and a second budget associated with at least the one or more first keywords of the plurality of keywords. The method also can include determining a second CPC bid for each of the one or more first keywords using the second objective and the second budget. The method also can include determining one or more second internal bids by the second entity for each of the one or more second keywords by multiplying at least the second CPC bid and a second pacing multiplier. The second pacing multiplier can be based on a second overall pacing by the second entity equal to a second planned spend amount of the second entity divided by a second allocated spend amount of the second entity. The method also can include performing a first iterative internal auction. The method also can include determining the one or more first internal bids from the first entity comprise a highest bid for the one or more first keywords from the plurality of entities. The method also can optionally include coordinating bidding by only the first entity of the plurality of entities for the one or more first keywords on a third-party external auction.

Figure 1:
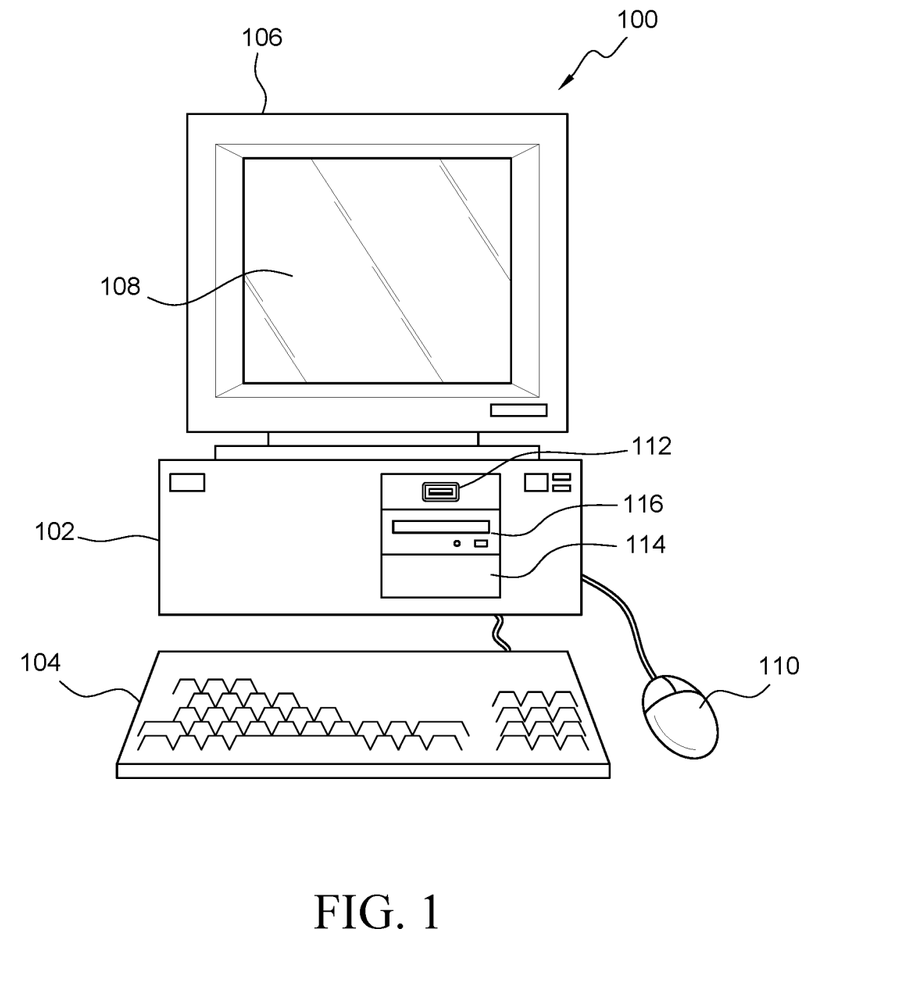
FIG. 1 illustrates a front elevational view of a computer system that is suitable for implementing various embodiments of the systems disclosed in FIGS. 3 and 5.
Figure 2:
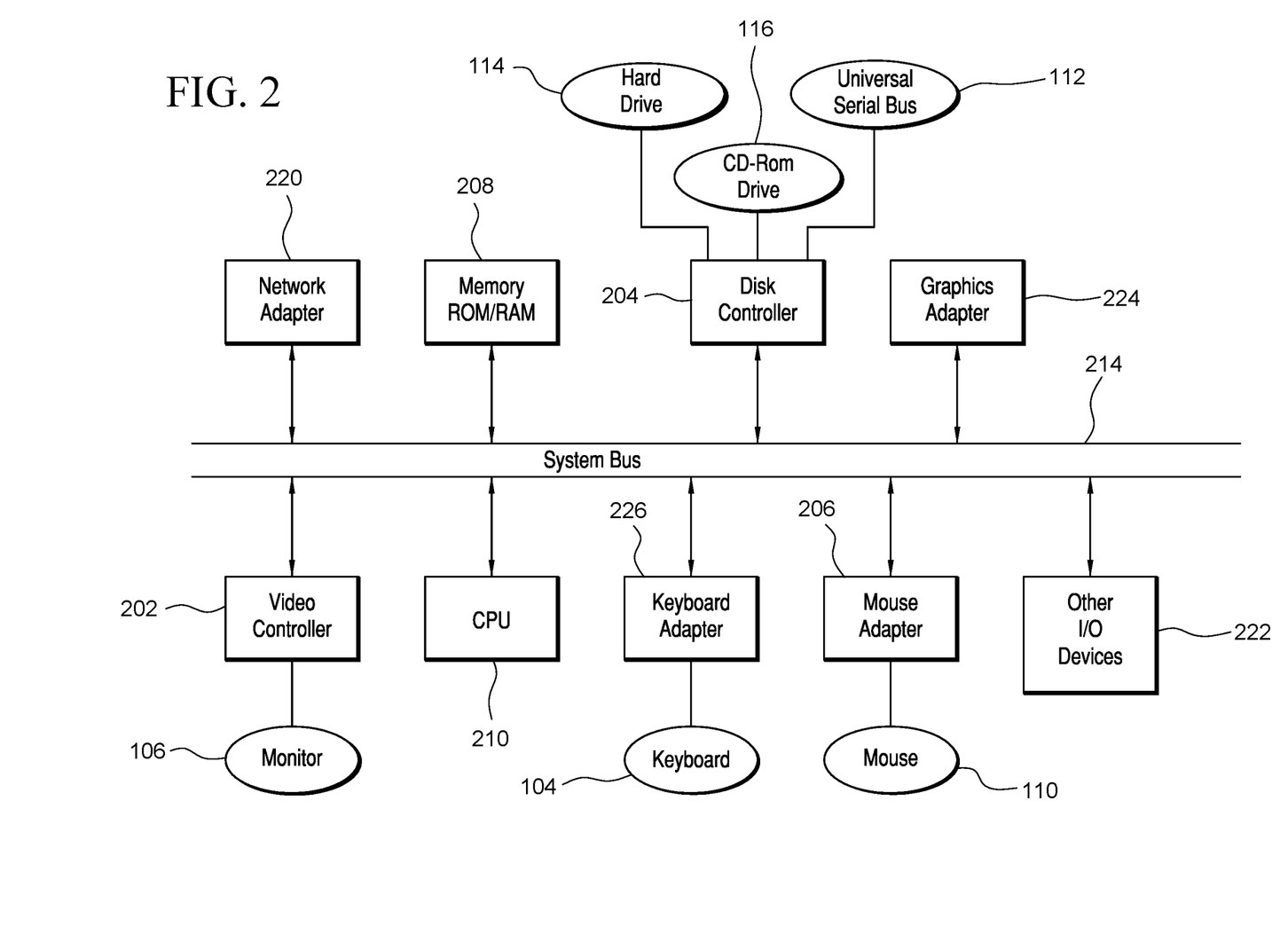
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile (e.g., non-transitory) memory, such as, for example, read only memory (ROM) and/or (ii) volatile (e.g., transitory) memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. The memory storage module(s) of the various embodiments disclosed herein can comprise memory storage unit 208, an external memory storage drive (not shown), such as, for example, a USB-equipped electronic memory storage drive coupled to universal serial bus (USB) port 112 (FIGS. 1-2), hard drive 114 (FIGS. 1-2), a CD-ROM and/or DVD for use with CD-ROM and/or DVD drive 116 (FIGS. 1-2), a floppy disk for use with a floppy disk drive (not shown), an optical disc (not shown), a magneto-optical disc (now shown), magnetic tape (not shown), etc. Further, non-volatile or non-transitory memory storage module(s) refer to the portions of the memory storage module(s) that are non-volatile (e.g., non-transitory) memory.

In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
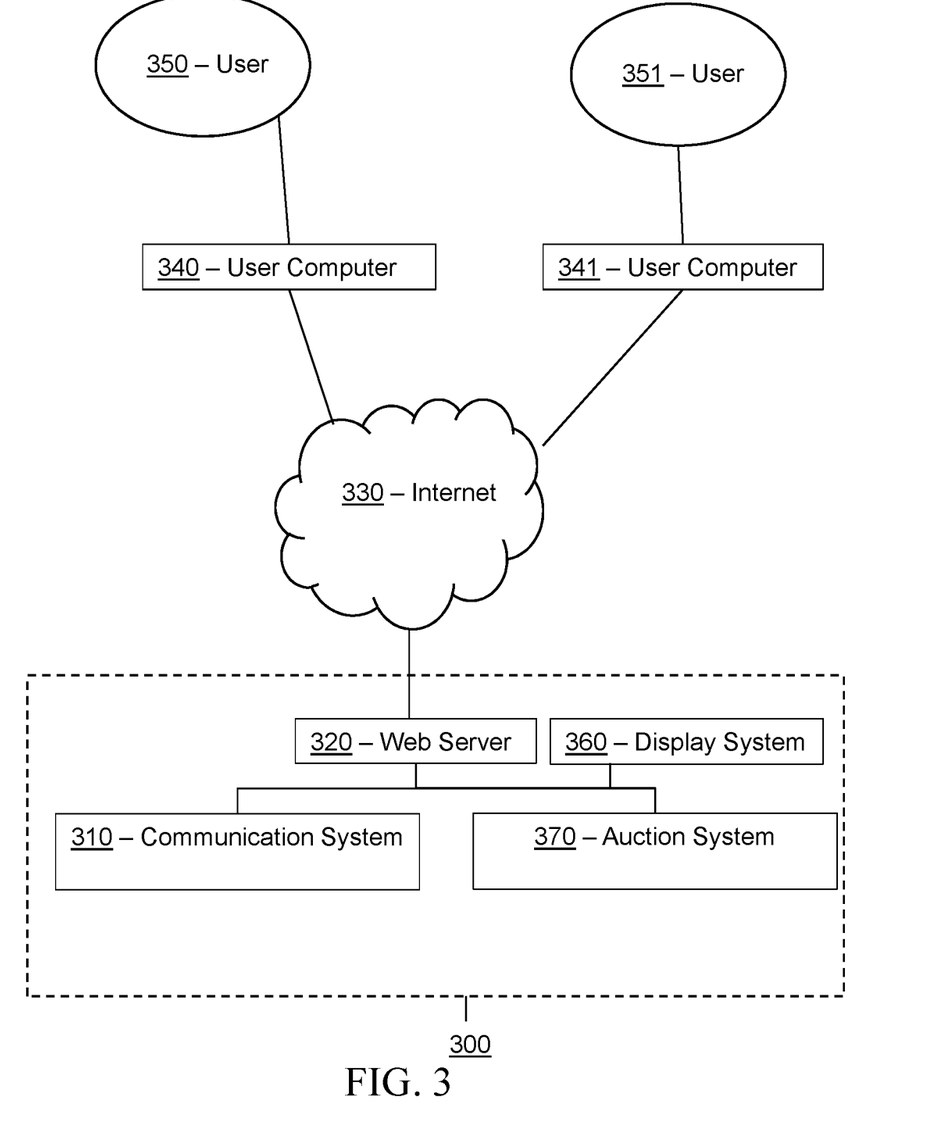
FIG. 3 illustrates a representative block diagram of a system, according to an embodiment.

Turning ahead in the drawings, FIG. 3 illustrates a block diagram of a system 300 that can be employed for an internal auction system for search engine marketing, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a communication system 310, a web server 320, a display system 360, and/or an auction system 370. Communication system 310, web server 320, display system 360 and/or auction system 370 can each be a computer system, such as computer system 100 (FIG. 1), as described above, and can each be a single computer, a single server, or a cluster or collection of computers or servers, or a cloud of computers or servers. In another embodiment, a single computer system can host each of two or more of communication system 310, web server 320, display system 360 and/or auction system 370. Additional details regarding communication system 310, web server 320, display system 360 and auction system 370 are described herein.

In many embodiments, system 300 also can comprise user computers 340, 341. In some embodiments, user computers 340, 341 can be a mobile device. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can comprise the Virtual Retinal Display™ product, or similar product by the University of Washington of Seattle, Wash., United States of America. Meanwhile, in further specific examples, a limb mountable wearable user computer device can comprise the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In some embodiments, web server 320 can be in data communication through Internet 330 with user computers (e.g., 340, 341). In certain embodiments, user computers 340-341 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, communication system 310, web server 320, display system 360 and/or auction system 370 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) communication system 310, web server 320, display system 360 and/or auction system 370 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of communication system 310, web server 320, display system 360 and/or auction system 370. In a similar manner, the processing module(s) and the memory storage module(s) can be local and/or remote to each other.

In many embodiments, communication system 310, web server 320, display system 360 and/or auction system 370 can be configured to communicate with one or more user computers 340 and 341. In some embodiments, user computers 340 and 341 also can be referred to as customer computers. In some embodiments, communication system 310, web server 320, display system 360 and/or auction system 370 can communicate or interface (e.g., interact) with one or more customer computers (such as user computers 340 and 341) through a network or internet 330. Internet 330 can be an intranet that is not open to the public. Accordingly, in many embodiments, communication system 310, web server 320, display system 360 and/or auction system 370 (and/or the software used by such systems) can refer to a back end of system 300 operated by an operator and/or administrator of system 300, and user computers 340 and 341 (and/or the software used by such systems) can refer to a front end of system 300 used by one or more users 350 and 351, respectively. In some embodiments, users 350 and 351 also can be referred to as customers, in which case, user computers 340 and 341 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, communication system 310, web server 320, display system 360 and/or auction system 370 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between communication system 310, web server 320, display system 360 and/or auction system 370, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

Figure 4:
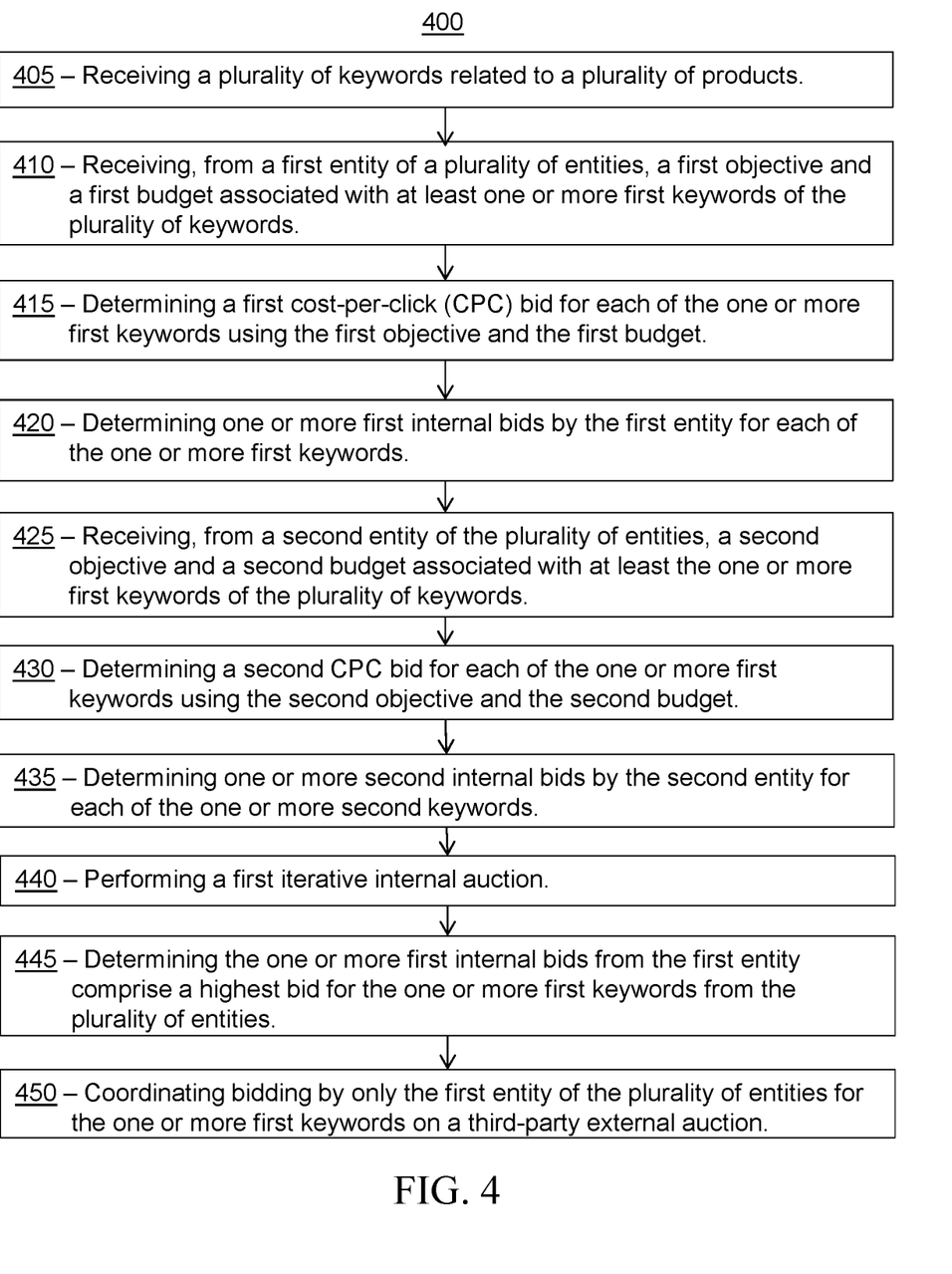
FIG. 4 is a flowchart for a method, according to certain embodiments.
Figure 5:
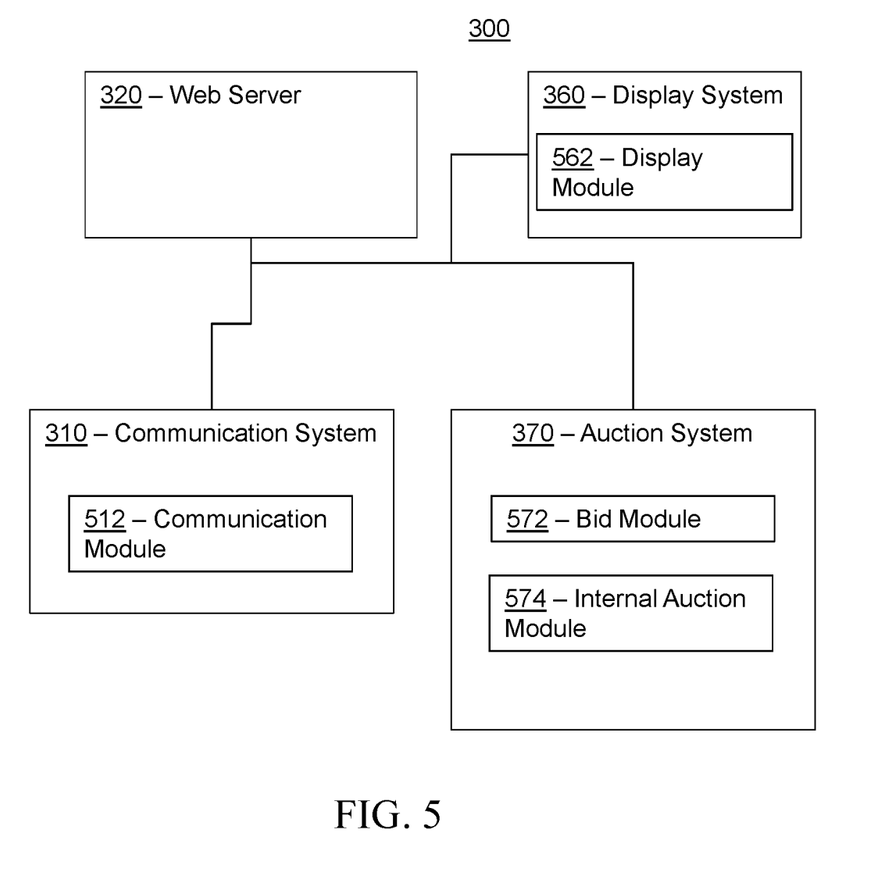
FIG. 5 illustrates a representative block diagram of a portion of the system of FIG. 3, according to an embodiment.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules 512, 562, 572, and/or 574 (FIG. 5). Such non-transitory memory storage modules can be part of a computer system such as communication system 310, web server 320, display system 360 and/or auction system 370 (FIGS. 3 & 5). The processing module(s) can be similar or identical to the processing module(s) described above with respect to computer system 100 (FIG. 1).

In conventional search engine marketing auctions, a plurality of entities can bid on a plurality of keywords for association with a link or advertisement of the entity. Sometimes, different entities from a single retailer can each bid on a single keyword, thus unnecessarily increasing the bidding and ultimately the CPC of the link or advertisement displayed with a keyword on a search engine. For example, both a first internal entity and a second internal entity of the same retailer can each have separate budgets to bid on the words "computer" and "TV," while an external entity not part of the retailer can have a budget to bid on the word "computer." If the three entities set up different account and all submit separate bids for the word "computer," CPC will increase significantly.

To solve this technological problem, method 400 can accommodate different objectives from different entities. For example, some entities may want to maximize awareness, while other entities may want to maximize return on advertising spending (ROAS). Method 400 also can ensure entities have sufficient budget to spend on the assigned keywords and fully exploit the opportunity to bid for assigned keywords on a third-party external auction. Furthermore, method 400 is scalable and can handle tens of millions of keywords and millions of items of numerous entities.

Returning to FIG. 4, method 400 can comprise an activity 405 of receiving, retrieving, and/or storing a plurality of keywords related to a plurality of products. The plurality of keywords can be associated with and/or used for SEM. SEM also can include search engine optimization (SEO). Each of the keywords can be associated with one or more products. In some embodiments, receiving, retrieving, and/or storing a plurality of keywords related to a plurality of products can comprise using a distributed network comprising distributed memory architecture to receive, retrieve, and/or store a plurality of keywords related to a plurality of products. This distributed architecture can reduce the impact on the network and system resources to reduce congestion in bottlenecks while still allowing data to be accessible from a central location.

Continuing in FIG. 4, method 400 further can comprise an activity 410 of receiving, from a first entity of a plurality of entities, a first objective and a first budget associated with at least one or more first keywords of the plurality of keywords. In some embodiments, the budget for each entity can comprise the budget for all of the keywords for which the entity will be bidding. Thus, the budget received by system 300 (FIG. 3) for each entity can be for use in bidding for a single keyword or a plurality of keywords. The objective for each entity can comprise one or more of: (1) an estimated number of orders for the entity resulting from or increasing after starting the advertising of the one or more keywords being advertised on a search engine; and/or (2) an estimated revenue for the entity resulting from or increasing after starting the advertising of the one or more keywords being advertised on the search engine.

In some embodiments, each entity of the plurality of entities can comprise an entity that has entered into a cooperative agreement with each of the other entities of the plurality of entities. In some embodiments, two or more of the plurality of entities can comprise affiliated entities of a single retailer. In some embodiments, two or more of the plurality of entities can comprise unaffiliated cooperative entities. Thus, in some embodiments, the internal auction can comprise a plurality of affiliated or internal entities and a plurality of unaffiliated or external entities. In other embodiments, the plurality of entities can be online a single entity such that method 400 is used only by divisions within a single legal entity.

In certain embodiments, a CPC bid can be determined by system 300 (FIG. 3) for each of the plurality of entities. Returning to FIG. 4, method 400 further can comprise an activity 415 of determining a first CPC bid for the first entity for each of the one or more first keywords using the first objective and the first budget. The CPC bid can be generated for each entity using one or more bidding algorithms that include an objective for the entity and/or a budget for the entity.

With the CPC bid determined, system 300 (FIG. 3) can use the CPC, along with a pacing multiplier and a priority multiplier to determine an internal bid for each keyword for which an entity is bidding. Returning to FIG. 4, method 400 further can comprise an activity 420 of determining one or more first internal bids by the first entity for each of the one or more first keywords. More particularly, activity 420 can comprise determining one or more first internal bids by the first entity for each of the one or more first keywords by multiplying at least the first CPC bid and a first pacing multiplier. The first pacing multiplier can be based on a first overall pacing by the first entity equal to a first planned spend amount of the first entity divided by a first allocated spend amount of the first entity. A goal of performing an internal auction with the plurality of entities can be to bring the overall pacing for each entity as close to a value of one as possible. An overall pacing of one for an entity indicates that the planned spend amount for the entity is equal to an allocated spend amount for the entity after each iteration of the internal auction. The overall pacing, therefore, can take into account the planned spend amount for all of the keywords for which an entity is bidding, and also all the keywords the entity has been awarded after each iteration of the internal auction.

In some embodiments, determining the one or more first internal bids can comprise determining the one or more first internal bids by the first entity for each of the one or more first keywords by multiplying (1) the first CPC bid, (2) the first pacing multiplier, and (3) a first priority multiplier. The first priority multiplier can be determined or otherwise set by the first entity. In some embodiments, the priority multiplier can be set as a default value of one. As shall be described in greater detail below, internal bids can comprise an initial internal bid, as well as additional internal bids. Initial internal bids can comprise internal bids for keywords before a first iteration of the internal auction, while additional internal bids can comprise internal bids for second or subsequent iterations of the internal auction.

While reference has been made thus far to a first entity of the plurality of entities, similar activities can be performed for each entity of the plurality of entities. For example, continuing with FIG. 4, method 400 further can comprise an activity 425 of receiving, from a second entity of the plurality of entities, a second objective and a second budget associated with at least the one or more first keywords of the plurality of keywords. Similar to the first objective, the second objective for the second entity can comprise one or more of: (1) a second estimated number of orders for the second entity resulting from the one or more first keywords being advertised on the search engine; and/or (2) a second estimated revenue for the second entity resulting from the one or more first keywords being advertised on the search engine.

Similar to activity 415, method 400 further can comprise an activity 430 of determining a second CPC bid for each of the one or more first keywords using the second objective and the second budget. Moreover, similar to activity 420, method 400 further can comprise an activity 435 of determining one or more second internal bids by the second entity for each of the one or more second keywords. More particularly, activity 435 can comprise determining one or more second internal bids by the second entity for each of the one or more second keywords by multiplying at least the second CPC bid and a second pacing multiplier. The second pacing multiplier can be based on a second overall pacing by the second entity equal to a second planned spend amount of the second entity divided by a second allocated spend amount of the second entity. In some embodiments, determining the one or more second internal bids comprises determining the one or more second internal bids by the second entity for each of the one or more first keywords by multiplying (1) the second CPC bid, (2) the second pacing multiplier, and (3) a second priority multiplier. The second priority multiplier can be determined or selected by the second entity.

In many embodiments, activities 410 and 425 can be performed simultaneously, or at least before activities 415 and 430. In the same embodiments, activities 415 and 430 can be performed simultaneously with each other, or at least before activities 420 and 435. In other embodiments, activities 410, 415, and 420 are performed in sequence and in parallel with activities 425, 430, and 435.

After determining at least initial internal bids for each of the plurality of entities, system 300 can perform at least a first iteration of an internal auction. Thus, returning to FIG. 4, method 400 further can comprise an activity 440 of performing a first iterative internal auction. If after the first iterative internal auction, the overall pacing for each entity is determined to be approximately one, method 400 can continue to activity 445, which is explained later.

In some embodiments, however, method 400 can comprise an activity of determining if the first overall pacing is approximately one and if the second overall pacing is approximately one after performing the first iterative internal auction. Overall pacing that is not approximately one or close to one indicates that an entity has either (1) planned on spending more for one or more keywords than has been allocated to them during the most recent iteration of the internal auction, or (2) been allocated more than the entity planned on spending for one or more keywords. If system 300 (FIG. 3) determines that the overall pacing is not approximately one for each of the plurality of entities, the pacing multipliers for each of the entities can be updated, and system 300 can determine that at least a second iterative internal auction should take place. In some embodiments, the pacing multiplier can be updated using a formula of pacing_multiplier=planned_spend/allocated_spend. In some embodiments, the pacing factor can be updated manually or can be based on a recommendation by a machine learnt model using multiple factors, such as but not limited to historical data and/or forecasted traffic models. For example, if the pacing factor can be adjusted relative to the expected traffic pattern for certain days such as Black Friday or Cyber Monday.

If system 300 determines that a second or additional iterative internal auction should take place because the overall pacing for one or more entities of the plurality of entities is not approximately one or close enough to one to satisfy predetermined auction requirements, method 400 (FIG. 4) can comprise additional activities. For example, method 400 further can comprise an activity of determining one or more first additional internal bids by the first entity for at least each of the one or more first keywords by multiplying (1) the first CPC bid, (2) the first pacing multiplier as updated, and/or (3) the first priority multiplied. Similarly, method 400 further can comprise an activity of determining the one or more second additional internal bids by the second entity for each of the one or more second keywords by multiplying (1) the second CPC bid, (2) the second pacing multiplier as updated, and/or (3) the second priority multiplier. Using the updated pacing multipliers subsequently raises or lowers the internal bid for each of the entities, thus potentially altering what keywords are awarded to which entities. After determining additional internal bids for the entities, method 400 further can comprise an activity of performing a second iterative internal auction. The activities determining overall pacing for the entities, updating pacing multipliers, determining additional internal bids, and performing additional iterative internal auctions can be repeated as many times as necessary to bring the overall pacing of each of the plurality of entities to approximately one or as close to one as is possible.

Returning to FIG. 4, once the overall pacing for each of the entities is approximately one, method 400 further can comprise an activity 445 of determining the one or more first internal bids from the first entity comprise a highest bid for the one or more first keywords from the plurality of entities. In certain embodiments, determining the one or more first internal bids from the first entity comprise the highest bid for the one or more first keywords can comprise determining that the one or more first additional internal bids from the first entity comprise the highest bid for the one or more first keywords from the plurality of entities. Thus, an entity with a highest bid for a keyword when the overall pacing for each entity is approximately one can be awarded the keyword for the internal auction.

Continuing with FIG. 4, method 400 also can comprise an activity 450 of coordinating a display of a status of the third-part external auction. Once the plurality of keywords have been awarded to entities participating in the internal auction, some methods can optionally comprise an activity of coordinating bidding for the keywords by the winning entities on a third-party external auction for SEM. For example, if a first entity of the plurality of entities was awarded a first keyword in the internal auction, only the first entity of the plurality of entities will be allowed to bid for the keyword on a third-party external auction for SEM. Thus, method 400 further can comprise an activity 455 of coordinating bidding by only the first entity of the plurality of entities for the one or more first keywords on a third-party external auction.

Continuing with FIG. 4, method 400 also can comprise activity of coordinating a display of the status of the internal auction. The status can be an intermediate and/or a real-time status and/or the final request. In many embodiments, the status can notify the entity of whether or not the entity lost the internal auction (with no additional details) or won the internal auction (plus additional details). In some embodiments, the status can provide the winning details to a losing entity.

While reference has been made to one or more keywords, it is further contemplated that each entity can bid on a plurality of keywords. In some embodiments, some of the plurality of keywords being bid on by an entity can overlap with some of the keywords beings bid on by a first different entity, and others of the plurality of keywords being bid on by the entity can overlap with other keywords being bid on by a second different entity. For additional keywords, CPC bids can be determined using the objectives and budget for the first entity. For example, in some embodiments, method 400 can comprise activities of determining a third CPC bid for the first entity for each of one or more second keywords using the first objective and the first budget. After the CPC bid is determined for an additional keyword, an internal bid for the additional keyword can be determined using the CPC for the additional keyword, the pacing multiplier for the entity, and the priority multiplier for the entity. For example, method 400 also can comprise an activity of determining one or more third initial internal bids by the first entity for each of the one or more second keywords by multiplying (1) the third CPC bid, (2) the first pacing multiplier, and/or (3) the first priority multiplier.

Similarly, method 400 also can comprise activities of determining a fourth CPC bid for the second entity for each of one or more third keywords using the second objective and the second budget and also determining one or more fourth internal bids by the second entity for each of the one or more third keywords by multiplying (1) the fourth CPC bid, (2) the second pacing multiplier, and/or (3) the second priority multiplier. The one or more second keywords and the one orm ore third keywords can be mutually exclusive sets of keywords. After performing the first iterative internal auction, method 400 also can comprise activities of determining the one or more fourth internal bids from the second entity comprise a highest bid from the plurality of entities for the one or more third keywords and also coordinating bidding by only the second entity of the plurality of entities for the one or more third keywords on the third-party external auction.

As noted above, the pacing multiplier can be updated after each iterative internal auction. Thus, in some embodiments, method 400 can optionally comprise an activity of determining one or more third additional internal bids by the first entity for at least each of the one or more second keywords by multiplying at least the third CPC bid and the first pacing multiplier as updated. Similarly, method 400 can optionally comprise an activity of determining one or more fourth additional internal bids by the second entity for at least each of the one or more third keywords by multiplying at least the fourth CPC bid and the second pacing multiplier as updated. In these and other embodiments, determining the one or more fourth internal bids from the second entity comprise the highest bid for the one or more third keywords can comprise determining that the one or more fourth additional internal bids from the second entity comprise the highest bid for the one or more third keywords from the plurality of entities.

FIG. 5 illustrates a block diagram of a portion of system 300 comprising communication system 310, web server 320, display system 360 and/or auction system 370, according to the embodiment shown in FIG. 3. Each of communication system 310, web server 320, display system 360 and/or auction system 370, is merely exemplary and not limited to the embodiments presented herein. Each of communication system 310, web server 320, display system 360 and/or auction system 370, can be employed in many different embodiments or examples not specifically depicted or described herein. In some embodiments, certain elements or modules of communication system 310, web server 320, display system 360 and/or auction system 370, can perform various procedures, processes, and/or acts. In other embodiments, the procedures, processes, and/or acts can be performed by other suitable elements or modules.

In many embodiments, communication system 310 can comprise non-transitory memory storage module 512. Memory storage module 512 can be referred to as communication module 512. In many embodiments, communication module 512 can store computing instructions configured to run on one or more processing modules and perform one or more acts of method 400 (e.g., activity 405 of receiving a plurality of keywords related to a plurality of products, activity 410 of receiving, from a first entity of a plurality of entities, a first objective and a first budget associated with at least one or more first keywords of the plurality of keywords, activity 425 receiving, from a second entity of a plurality of entities, a second objective and a second budget associated with at least the one or more first keywords of the plurality of keywords, and activity 460 of coordinating bidding by only the first entity of the plurality of entities for the one or more first keywords on a third-party external auction (FIG. 4)).

In many embodiments, display system 360 can comprise non-transitory storage module 562. Memory storage module 562 can be referred to as display module 562. In many embodiments, display module 562 can store computing instructions configured to run on one or more processing modules and perform one or more acts of method 400 (e.g., activity 450 coordinating a display of the status of the third-party external auction, and activity 460 of coordinating a display of the status of the internal auction (FIG. 4)).

In many embodiments, auction system 370 can comprise non-transitory memory storage module 572. Memory storage module 572 can be referred to as bid module 572. In many embodiments, bid module 572 can store computing instructions configured to run on one or more processing modules and perform one or more acts of method 400 (e.g., activity 415 of determining a first CPC bid for each of the one or more first keywords using the first objective and the first budget, activity 420 of determining one or more first internal bids by the first entity for each of the one or more first keywords, activity 430 of determining a second CPC bid for each of the one or more first keywords using the second objective and the second budget, and activity 435 of determining one or more second internal bids by the second entity for each of the one or more second keywords (FIG. 4)).

In many embodiments, auction system 370 also can comprise non-transitory storage module 574. Memory storage module 574 can be referred to as internal auction module 574. In many embodiments, internal auction module 574 can store computing instructions configured to run on one or more processing modules and perform one or more acts of method 400 (e.g., activity 440 of performing a first iterative internal auction and activity 445 of determining the one or more first internal bids from the first entity comprise a highest bid for the one or more first keywords from the plurality of entities (FIG. 4)).

Although systems and methods for an internal auction system for search engine marketing have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
    one or more processors; and
    one or more non-transitory storage devices storing computing instructions configured to run on the one or more processors and perform acts of:
        receiving, at the one or more processors, a plurality of keywords related to a plurality of products, the plurality of keywords for search engine marketing;
        receiving, at the one or more processors and from a first entity of a plurality of entities, a first objective and a first budget associated with at least one or more first keywords of the plurality of keywords;
        determining, using the one or more processors, a first cost-per-click (CPC) bid for each of the one or more first keywords using the first objective and the first budget;
        determining, using the one or more processors, one or more first internal bids by the first entity for each of the one or more first keywords by multiplying:
            the first CPC bid;
            a first pacing multiplier, the first pacing multiplier based on a first overall pacing by the first entity equal to a first planned spend amount of the first entity divided by a first allocated spend amount of the first entity; and
            a first priority multiplier determined by the first entity;
        receiving, at the one or more processors and from a second entity of the plurality of entities, a second objective and a second budget associated with at least the one or more first keywords of the plurality of keywords;
        determining, using the one or more processors, a second CPC bid for each of the one or more first keywords using the second objective and the second budget;
        determining, using the one or more processors, one or more second internal bids by the second entity for each of one or more second keywords by multiplying:
            the second CPC bid;
            a second pacing multiplier, the second pacing multiplier based on a second overall pacing by the second entity equal to a second planned spend amount of the second entity divided by a second allocated spend amount of the second entity; and
            a second priority multiplier determined by the second entity;
        performing, using the one or more processors, a first iterative internal auction;
        determining, using the one or more processors, when the one or more first internal bids from the first entity comprise a highest bid for the one or more first keywords from the plurality of entities;
        in response to determining when the one or more first internal bids comprise the highest bid, coordinating, using the one or more processors, bidding by only the first entity of the plurality of entities for the one or more first keywords on a third-party external auction; and
        facilitating a display of one or more advertisements for the one or more first keywords on a third-party search engine.

2. The system of claim 1, wherein:
    the one or more non-transitory storage devices storing the computing instructions are further configured to run on the one or more processors and perform acts of:
        after performing the first iterative internal auction, determining when the first overall pacing is approximately one and when the second overall pacing is approximately one;
        updating the first pacing multiplier when the first overall pacing is not approximately one;
        updating the second pacing multiplier when the second overall pacing is not approximately one;
        determining one or more first additional internal bids by the first entity for at least each of the one or more first keywords by multiplying at least the first CPC bid and the first pacing multiplier as updated;
        determining one or more second additional internal bids by the second entity for at least each of the one or more first keywords by multiplying at least the second CPC bid and the second pacing multiplier as updated; and
        performing a second iterative internal auction; and
    determining the one or more first internal bids from the first entity comprise the highest bid for the one or more first keywords comprises determining that the one or more first additional internal bids from the first entity comprise the highest bid for the one or more first keywords from the plurality of entities.

3. The system of claim 2, wherein:
    determining the one or more first additional internal bids comprises determining the one or more first additional bids by the first entity for each of the one or more first keywords by multiplying (1) the first CPC bid, (2) the first pacing multiplier as updated, and (3) the first priority multiplier; and determining the one or more second additional internal bids comprises determining the one or more second additional internal bids by the second entity for each of the one or more second keywords by multiplying (1) the second CPC bid, (2) the second pacing multiplier as updated, and (3) the second priority multiplier.

4. The system of claim 2, wherein the one or more non-transitory storage devices storing the computing instructions are further configured to run on the one or more processors and perform acts of:

determining a third CPC bid for the first entity for each of the one or more second keywords using the first objective and the first budget;

determining one or more third internal bids by the first entity for each of the one or more second keywords by multiplying at least the third CPC bid and the first pacing multiplier;

determining a fourth CPC bid for each of one or more third keywords using the second objective and the second budget;

determining one or more fourth internal bids by the second entity for each of the one or more third keywords by multiplying at least the fourth CPC bid and the second pacing multiplier;

after performing the first iterative internal auction, determining the one or more fourth internal bids from the second entity comprise a highest bid from the plurality of entities for the one or more third keywords; and coordinating bidding by only the second entity of the plurality of entities for the one or more third keywords on the third-party external auction.

5. The system of claim 4, wherein:

determining the one or more third internal bids comprises determining one or more third initial internal bids by the first entity for each of the one or more second keywords by multiplying (1) the third CPC bid, (2) the first pacing multiplier, and (3) the first priority multiplier;

determining the one or more fourth internal bids comprises determining one or more fourth initial internal bids by the second entity for each of the one or more third keywords by multiplying (1) the fourth CPC bid, (2) the second pacing multiplier, and (3) the second priority multiplier;

the one or more non-transitory storage devices storing the computing instructions are further configured to run on the one or more processors and perform acts of:

determining one or more third additional internal bids by the first entity for at least each of the one or more second keywords by multiplying at least the third CPC bid and the first pacing multiplier as updated; and determining one or more fourth additional internal bids by the second entity for at least each of the one or more third keywords by multiplying at least the fourth CPC bid and the second pacing multiplier as updated; and determining the one or more fourth internal bids from the second entity comprise the highest bid for the one or more third keywords comprises determining that the one or more fourth additional internal bids from the second entity comprise the highest bid for the one or more third keywords from the plurality of entities.

6. The system of claim 1, wherein:

the first objective comprises one or more of:
(1) a first estimated number of orders for the first entity resulting from the one or more first keywords being advertised on a search engine; or
(2) a first estimated revenue for the first entity resulting from the one or more first keywords being advertised on the search engine; and the second objective comprises one or more of:
(1) a second estimated number of orders for the second entity resulting from the one or more first keywords being advertised on the search engine; or
(2) a second estimated revenue for the second entity resulting from the one or more first keywords being advertised on the search engine.

7. The system of claim 1, wherein the first entity and the second entity comprise affiliated entities of a single retailer.

8. The system of claim 1, wherein the first entity and the second entity comprise unaffiliated cooperative entities.

9. The system of claim 1, wherein:

the one or more non-transitory storage devices storing the computing instructions are further configured to run on the one or more processors and perform acts of:

after performing the first iterative internal auction, determining when the first overall pacing is approximately one and when the second overall pacing is approximately one;

updating the first pacing multiplier when the first overall pacing is not approximately one;

updating the second pacing multiplier when the second overall pacing is not approximately one;

determining one or more first additional internal bids by the first entity for at least each of the one or more first keywords by multiplying at least the first CPC bid and the first pacing multiplier as updated;

determining one or more second additional internal bids by the second entity for at least each of the one or more first keywords by multiplying at least the second CPC bid and the second pacing multiplier as updated; and performing a second iterative internal auction;

determining the one or more first internal bids from the first entity comprise the highest bid for the one or more first keywords comprises determining that the one or more first additional internal bids from the first entity comprise the highest bid for the one or more first keywords from the plurality of entities;

determining the one or more first additional internal bids by the first entity comprises determining the one or more first additional bids by the first entity for each of the one or more first keywords by multiplying (1) the first CPC bid, (2) the first pacing multiplier as updated, and (3) the first priority multiplier;

determining the one or more second additional internal bids by the second entity comprises determining the one or more second additional internal bids by the second entity for each of the one or more second keywords by multiplying (1) the second CPC bid, (2) the second pacing multiplier as updated, and (3) the second priority multiplier;

the one or more non-transitory storage devices storing the computing instructions are further configured to run on the one or more processors and perform acts of:

determining a third CPC bid for the first entity for each of the one or more second keywords using the first objective and the first budget;

determining one or more third internal bids by the first
entity for each of the one or more second keywords
by multiplying (1) the third CPC bid, (2) the first
pacing multiplier, and (3) the first priority multiplier;

determining a fourth CPC bid for each of one or more
third keywords using the second objective and the
second budget;

determining one or more fourth internal bids by the
second entity for each of the one or more third
keywords by multiplying (1) the fourth CPC bid, (2)
the second pacing multiplier, and (3) the second
priority multiplier;

after performing the first iterative internal auction,
determining the one or more fourth internal bids
from the second entity comprise a highest bid from
the plurality of entities for the one or more third
keywords;

coordinating bidding by only the second entity of the
plurality of entities for the one or more third keywords on the third-party external auction;

determining one or more third additional internal bids
by the first entity for at least each of the one or more
second keywords by multiplying at least the third
CPC bid and the first pacing multiplier as updated;
and determining one or more fourth additional internal bids
by the second entity for at least each of the one or
more third keywords by multiplying at least the
fourth CPC bid and the second pacing multiplier as
updated;

determining the one or more fourth internal bids from the
second entity comprise the highest bid for the one or
more third keywords comprises determining that the
one or more fourth additional internal bids from the
second entity comprise the highest bid for the one or
more third keywords from the plurality of entities;

the first objective comprises one or more of:
(1) a first estimated number of orders for the first entity
resulting from the one or more first keywords being
advertised on a search engine; or
(2) a first estimated revenue for the first entity resulting
from the one or more first keywords being advertised
on the search engine;

the second objective comprises one or more of:
(1) a second estimated number of orders for the second
entity resulting from the one or more first keywords
being advertised on the search engine; or
(2) a second estimated revenue for the second entity
resulting from the one or more first keywords being
advertised on the search engine; and the first entity and the second entity comprise affiliated
entities of a single retailer.

10. The system of claim 1, wherein:
the one or more non-transitory storage devices storing the
computing instructions are further configured to run on
the one or more processors and perform an act of:
after determining when the one or more first internal
bids comprise the highest bid, determining when the
first entity of the plurality of entities has a sufficient
budget to place the highest bid; and
coordinating the bidding further comprises in response to
determining when the one or more first internal bids
comprise the highest bid and after determining when
the first entity of the plurality of entities has a sufficient
budget, coordinating the bidding by only the first entity
of the plurality of entities for the one or more first
keywords on the third-party external auction.

11. A method comprising:
receiving, at one or more processors, a plurality of keywords related to a plurality of products, the plurality of
keywords for search engine marketing;
receiving, at the one or more processors and from a first
entity of a plurality of entities, a first objective and a
first budget associated with at least one or more first
keywords of the plurality of keywords;
determining, using the one or more processors, a first
cost-per-click (CPC) bid for each of the one or more
first keywords using the first objective and the first
budget;
determining, using the one or more processors, one or
more first internal bids by the first entity for each of the
one or more first keywords by multiplying:
the first CPC bid;
a first pacing multiplier, the first pacing multiplier
based on a first overall pacing by the first entity equal
to a first planned spend amount of the first entity
divided by a first allocated spend amount of the first
entity; and
a first priority multiplier determined by the first entity
receiving, at the one or more processors and from a
second entity of the plurality of entities, a second
objective and a second budget associated with at least
the one or more first keywords of the plurality of
keywords;
determining, using the one or more processors, a second
CPC bid for each of the one or more first keywords
using the second objective and the second budget;
determining, using the one or more processors, one or
more second internal bids by the second entity for each
of one or more second keywords by multiplying:
the second CPC bid;
a second pacing multiplier, the second pacing multiplier based on a second overall pacing by the second
entity equal to a second planned spend amount of the
second entity divided by a second allocated spend
amount of the second entity; and
a second priority multiplier determined by the second
entity;
performing, using the one or more processors, a first
iterative internal auction;
determining, using the one or more processors, when the
one or more first internal bids from the first entity
comprise a highest bid for the one or more first keywords from the plurality of entities;
in response to determining when the one or more first
internal bids comprise the highest bid, coordinating,
using the one or more processors, bidding by only the
first entity of the plurality of entities for the one or more
first keywords on a third-party external auction; and
facilitating a display of one or more advertisements for
the one or more first keywords on a third-party search
engine.

12. The method of claim 11, wherein:
the method further comprises:
after performing the first iterative internal auction,
determining when the first overall pacing is approximately one and when the second overall pacing is
approximately one;
updating the first pacing multiplier when the first
overall pacing is not approximately one;
updating the second pacing multiplier when the second
overall pacing is not approximately one;
determining one or more first additional internal bids
by the first entity for at least each of the one or more first keywords by multiplying at least the first CPC bid and the first pacing multiplier as updated;
determining one or more second additional internal bids by the second entity for at least each of the one or more first keywords by multiplying at least the second CPC bid and the second pacing multiplier as updated; and
performing a second iterative internal auction; and
determining the one or more first internal bids from the first entity comprise the highest bid for the one or more first keywords comprises determining that the one or more first additional internal bids from the first entity comprise the highest bid for the one or more first keywords from the plurality of entities.

13. The method of claim 12, wherein:
determining the one or more first additional internal bids comprises determining the one or more first additional bids by the first entity for each of the one or more first keywords by multiplying (1) the first CPC bid, (2) the first pacing multiplier as updated, and (3) the first priority multiplier; and
determining the one or more second additional internal bids comprises determining the one or more second additional internal bids by the second entity for each of the one or more second keywords by multiplying (1) the second CPC bid, (2) the second pacing multiplier as updated, and (3) the second priority multiplier.

14. The method of claim 12, wherein the method further comprises:
determining a third CPC bid for the first entity for each of the one or more second keywords using the first objective and the first budget;
determining one or more third internal bids by the first entity for each of the one or more second keywords by multiplying at least the third CPC bid and the first pacing multiplier;
determining a fourth CPC bid for each of one or more third keywords using the second objective and the second budget;
determining one or more fourth internal bids by the second entity for each of the one or more third keywords by multiplying at least the fourth CPC bid and the second pacing multiplier;
after performing the first iterative internal auction, determining the one or more fourth internal bids from the second entity comprise a highest bid from the plurality of entities for the one or more third keywords; and
coordinating bidding by only the second entity of the plurality of entities for the one or more third keywords on the third-party external auction.

15. The method of claim 14, wherein:
determining the one or more third internal bids comprises determining one or more third initial internal bids by the first entity for each of the one or more second keywords by multiplying (1) the third CPC bid, (2) the first pacing multiplier, and (3) the first priority multiplier;
determining the one or more fourth internal bids comprises determining one or more fourth initial internal bids by the second entity for each of the one or more third keywords by multiplying (1) the fourth CPC bid, (2) the second pacing multiplier, and (3) the second priority multiplier;
the method further comprises:
determining one or more third additional internal bids by the first entity for at least each of the one or more second keywords by multiplying at least the third CPC bid and the first pacing multiplier as updated; and
determining one or more fourth additional internal bids by the second entity for at least each of the one or more third keywords by multiplying at least the fourth CPC bid and the second pacing multiplier as updated; and
determining the one or more fourth internal bids from the second entity comprise the highest bid for the one or more third keywords comprises determining that the one or more fourth additional internal bids from the second entity comprise the highest bid for the one or more third keywords from the plurality of entities.

16. The method of claim 11, wherein:
the first objective comprises one or more of: (1) a first estimated number of orders for the first entity resulting from the one or more first keywords being advertised on a search engine; or (2) a first estimated revenue for the first entity resulting from the one or more first keywords being advertised on the search engine; and
the second objective comprises one or more of: (1) a second estimated number of orders for the second entity resulting from the one or more first keywords being advertised on the search engine; or (2) a second estimated revenue for the second entity resulting from the one or more first keywords being advertised on the search engine.

17. The method of claim 11, wherein the first entity and the second entity comprise affiliated entities of a single retailer.

18. The method of claim 11, wherein the first entity and the second entity comprise unaffiliated cooperative entities.

19. The method of claim 11, wherein:
the method further comprises:
after performing the first iterative internal auction, determining when the first overall pacing is approximately one and when the second overall pacing is approximately one;
updating the first pacing multiplier when the first overall pacing is not approximately one;
updating the second pacing multiplier when the second overall pacing is not approximately one;
determining one or more first additional internal bids by the first entity for at least each of the one or more first keywords by multiplying at least the first CPC bid and the first pacing multiplier as updated;
determining one or more second additional internal bids by the second entity for at least each of the one or more first keywords by multiplying at least the second CPC bid and the second pacing multiplier as updated; and
performing a second iterative internal auction;
determining the one or more first internal bids from the first entity comprise the highest bid for the one or more first keywords comprises determining that the one or more first additional internal bids from the first entity comprise the highest bid for the one or more first keywords from the plurality of entities;
determining the one or more first additional internal bids by the first entity comprises determining the one or more first additional bids by the first entity for each of the one or more first keywords by multiplying (1) the first CPC bid, (2) the first pacing multiplier as updated, and (3) the first priority multiplier;
determining the one or more second additional internal bids by the second entity comprises determining the one or more second additional internal bids by the second entity for each of the one or more second keywords by multiplying (1) the second CPC bid, (2) the second pacing multiplier as updated, and (3) the second priority multiplier;

the method further comprises:

determining a third CPC bid for the first entity for each of the one or more second keywords using the first objective and the first budget;

determining one or more third internal bids by the first entity for each of the one or more second keywords by multiplying (1) the third CPC bid, (2) the first pacing multiplier, and (3) the first priority multiplier;

determining a fourth CPC bid for each of one or more third keywords using the second objective and the second budget;

determining one or more fourth internal bids by the second entity for each of the one or more third keywords by multiplying (1) the fourth CPC bid, (2) the second pacing multiplier, and (3) the second priority multiplier;

after performing the first iterative internal auction, determining the one or more fourth internal bids from the second entity comprise a highest bid from the plurality of entities for the one or more third keywords;

coordinating bidding by only the second entity of the plurality of entities for the one or more third keywords on the third-party external auction;

determining one or more third additional internal bids by the first entity for at least each of the one or more second keywords by multiplying at least the third CPC bid and the first pacing multiplier as updated; and determining one or more fourth additional internal bids by the second entity for at least each of the one or more third keywords by multiplying at least the fourth CPC bid and the second pacing multiplier as updated;

determining the one or more fourth internal bids from the second entity comprise the highest bid for the one or more third keywords comprises determining that the one or more fourth additional internal bids from the second entity comprise the highest bid for the one or more third keywords from the plurality of entities;

the first objective comprises one or more of: (1) a first estimated number of orders for the first entity resulting from the one or more first keywords being advertised on a search engine; or (2) a first estimated revenue for the first entity resulting from the one or more first keywords being advertised on the search engine;

the second objective comprises one or more of: (1) a second estimated number of orders for the second entity resulting from the one or more first keywords being advertised on the search engine; or (2) a second estimated revenue for the second entity resulting from the one or more first keywords being advertised on the search engine; and the first entity and the second entity comprise affiliated entities of a single retailer.

20. The method of claim 11 wherein:

the method further comprises:

after determining when the one or more first internal bids comprise the highest bid, determining when the first entity of the plurality of entities has a sufficient budget to place the highest bid; and coordinating the bidding further comprises in response to determining when the one or more first internal bids comprise the highest bid and after determining when the first entity of the plurality of entities has a sufficient budget, coordinating bidding by only the first entity of the plurality of entities for the one or more first keywords on a third-party external auction.

* * * * *